(12) United States Patent
Haight

(10) Patent No.: US 10,674,851 B1
(45) Date of Patent: Jun. 9, 2020

(54) MICROWAVE BACON COOKER

(71) Applicant: David Haight, London (CA)

(72) Inventor: David Haight, London (CA)

( * ) Notice: Subject to any disclaimer, the term of this patent is extended or adjusted under 35 U.S.C. 154(b) by 304 days.

(21) Appl. No.: 15/859,822

(22) Filed: Jan. 2, 2018

(51) Int. Cl.
| | |
|---|---|
| A47J 27/00 | (2006.01) |
| A47J 36/02 | (2006.01) |
| H05B 6/64 | (2006.01) |
| A47J 37/06 | (2006.01) |
| A47J 43/18 | (2006.01) |
| F24C 15/16 | (2006.01) |
| A47J 36/34 | (2006.01) |
| A23L 13/00 | (2016.01) |

(52) U.S. Cl.
CPC ............ *A47J 27/002* (2013.01); *A23L 13/00* (2016.08); *A47J 36/027* (2013.01); *A47J 36/34* (2013.01); *H05B 6/6408* (2013.01); *A47J 37/0694* (2013.01); *A47J 43/18* (2013.01); *F24C 15/16* (2013.01); *Y10S 99/14* (2013.01)

(58) Field of Classification Search
CPC ...... A47J 36/027; A47J 37/0694; A47J 43/18; Y10S 99/14; H05B 6/6408; F24C 15/16
USPC ........ 219/732, 734, 762; 99/DIG. 14, 421 H, 99/444, 446, 448, 449, 450
See application file for complete search history.

(56) References Cited

U.S. PATENT DOCUMENTS

| | | | |
|---|---|---|---|
| 4,922,071 A * | 5/1990 | Samford | A23L 3/01 219/728 |
| 4,924,049 A | 5/1990 | Dexter, Jr. | |
| 4,952,764 A | 8/1990 | Harrington | |
| D318,206 S | 7/1991 | Watznauer | |
| 5,266,763 A * | 11/1993 | Colombo | B65D 25/18 219/734 |
| 5,714,740 A | 2/1998 | Kelly | |
| D514,874 S | 2/2006 | Eckley | |
| 7,004,064 B1 * | 2/2006 | Turner | A47J 43/18 99/446 |
| 8,466,396 B2 | 6/2013 | Carli | |
| 8,748,786 B2 * | 6/2014 | Birchmeier | B65D 1/36 219/729 |
| 8,772,685 B2 * | 7/2014 | Backaert | A47J 27/04 219/682 |
| 2001/0035408 A1 * | 11/2001 | Adams | A47J 36/027 219/734 |
| 2002/0096056 A1 * | 7/2002 | Hopkins | A47J 36/027 99/422 |
| 2002/0185013 A1 * | 12/2002 | London | A47J 36/022 99/450 |
| 2004/0094544 A1 * | 5/2004 | Kim | A47J 27/04 219/731 |
| 2007/0158339 A1 * | 7/2007 | Beckman | A47J 36/027 219/734 |

(Continued)

FOREIGN PATENT DOCUMENTS

WO    2010036527 A    4/2010

*Primary Examiner* — Jermie E Cozart

(57) ABSTRACT

The microwave bacon cooker is a cooking vessel. The microwave bacon cooker is configured for use with a microwave oven. The microwave bacon cooker is configured for use with bacon. The microwave bacon cooker contains the bacon while the bacon cooks in the microwave oven. The microwave bacon cooker comprises a tray, a foraminous cooking surface and a lid. The lid attaches to the tray. The foraminous cooking surface is contained within the structure formed by the lid and the tray.

15 Claims, 4 Drawing Sheets

(56) References Cited

U.S. PATENT DOCUMENTS

2008/0110353 A1    5/2008   Sims
2016/0174761 A1    6/2016   Paulsen

* cited by examiner

MICROWAVE BACON COOKER

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of personal and domestic articles including cooking vessels and other kitchen equipment, more specifically, a cooking vessel specifically adapted for use in a microwave oven.

SUMMARY OF INVENTION

The microwave bacon cooker is a cooking vessel. The microwave bacon cooker is configured for use with a microwave oven. The microwave bacon cooker is configured for use with bacon. The microwave bacon cooker contains the bacon while the bacon cooks in the microwave oven. The microwave bacon cooker comprises a tray, a foraminous cooking surface, and a lid. The lid attaches to the tray. The foraminous cooking surface is contained within the structure formed by the lid and the tray.

These together with additional objects, features and advantages of the microwave bacon cooker will be readily apparent to those of ordinary skill in the art upon reading the following detailed description of the presently preferred, but nonetheless illustrative, embodiments when taken in conjunction with the accompanying drawings.

In this respect, before explaining the current embodiments of the microwave bacon cooker in detail, it is to be understood that the microwave bacon cooker is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the microwave bacon cooker.

It is therefore important that the claims be regarded as including such equivalent construction insofar as they do not depart from the spirit and scope of the microwave bacon cooker. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
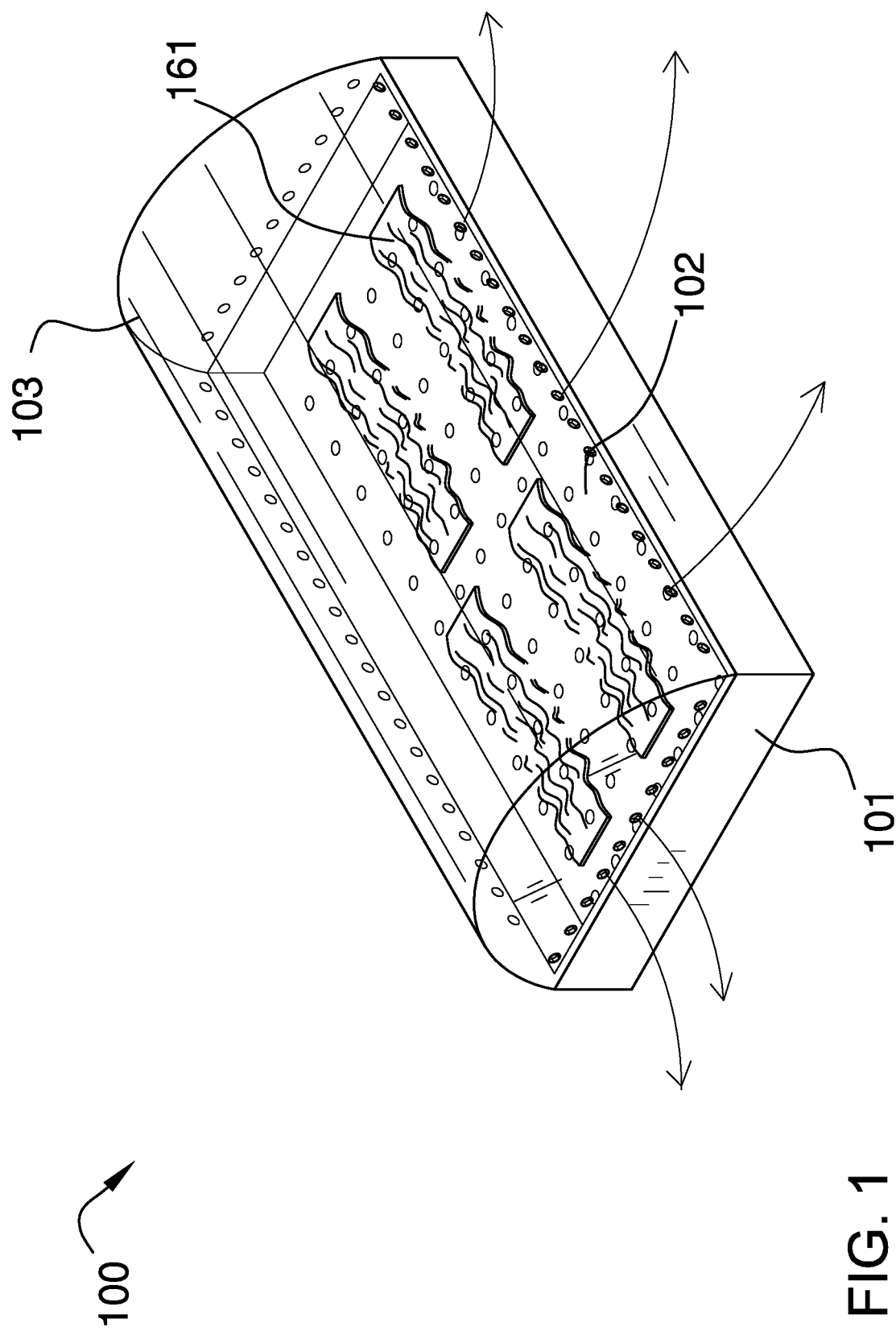
FIG. 1 is a perspective view of an embodiment of the disclosure.
Figure 2:
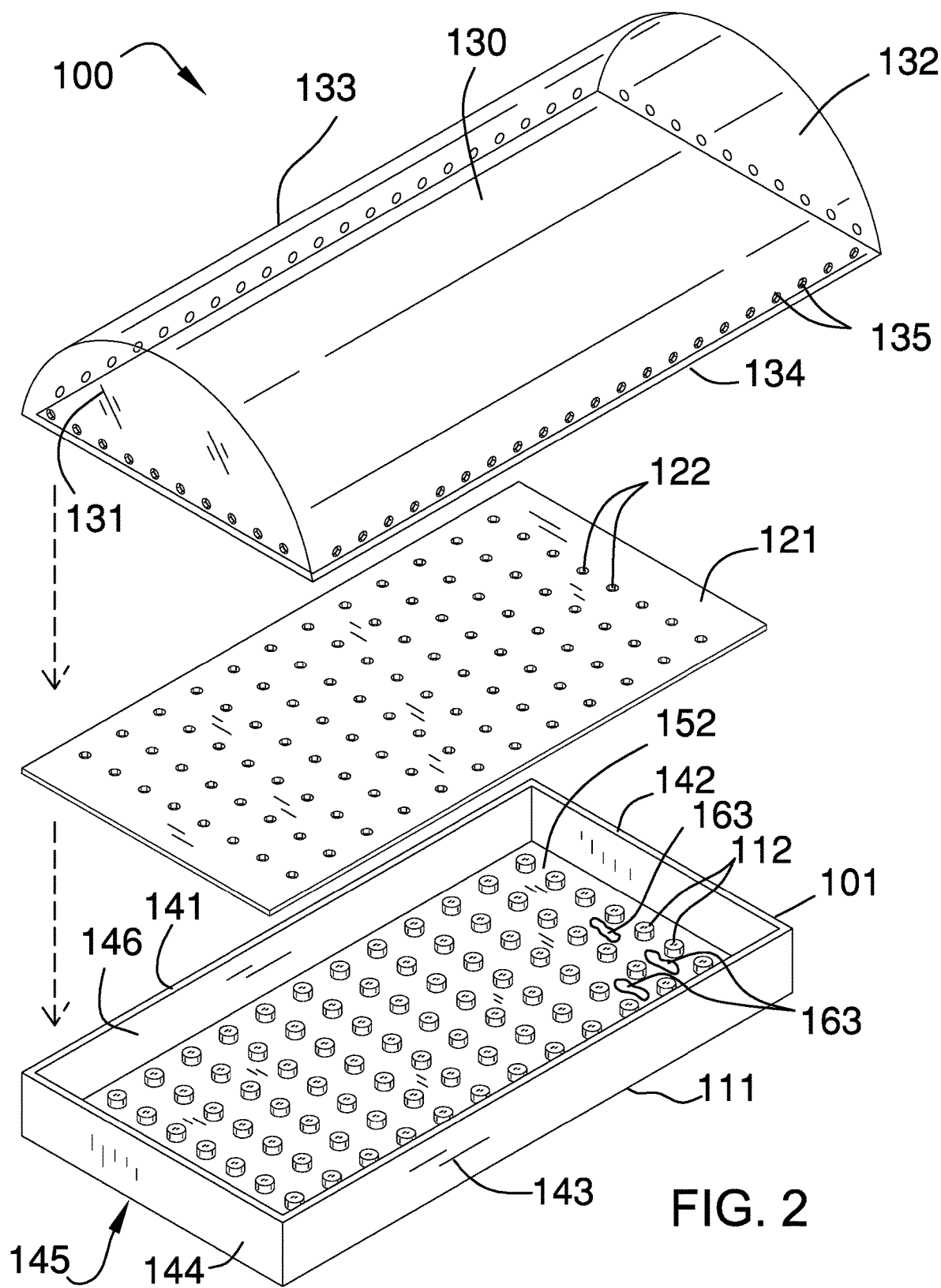
FIG. 2 is an exploded perspective view of an embodiment of the disclosure.
Figure 3:
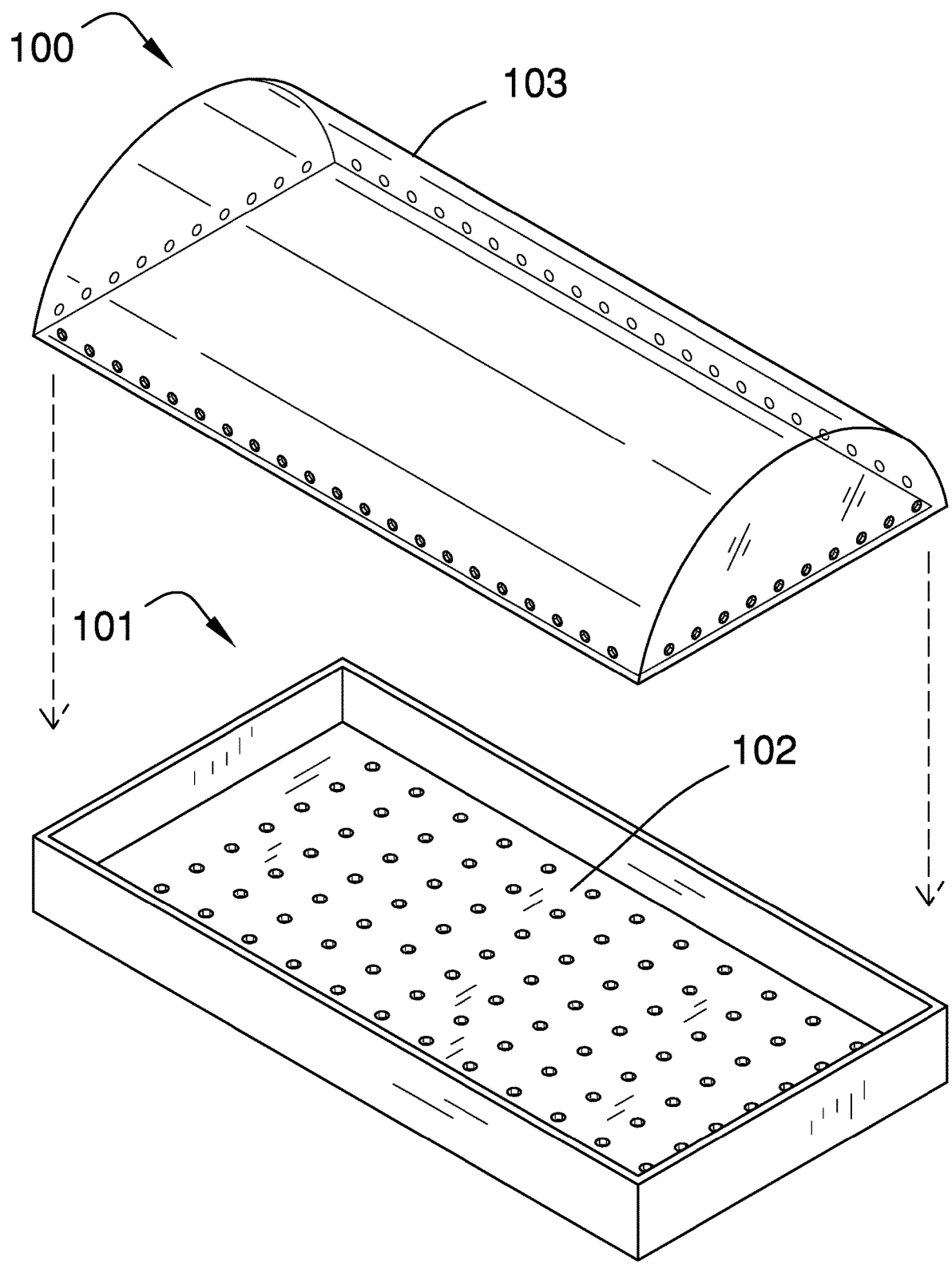
FIG. 3 is a partially exploded reverse perspective view of an embodiment of the disclosure.
Figure 4:
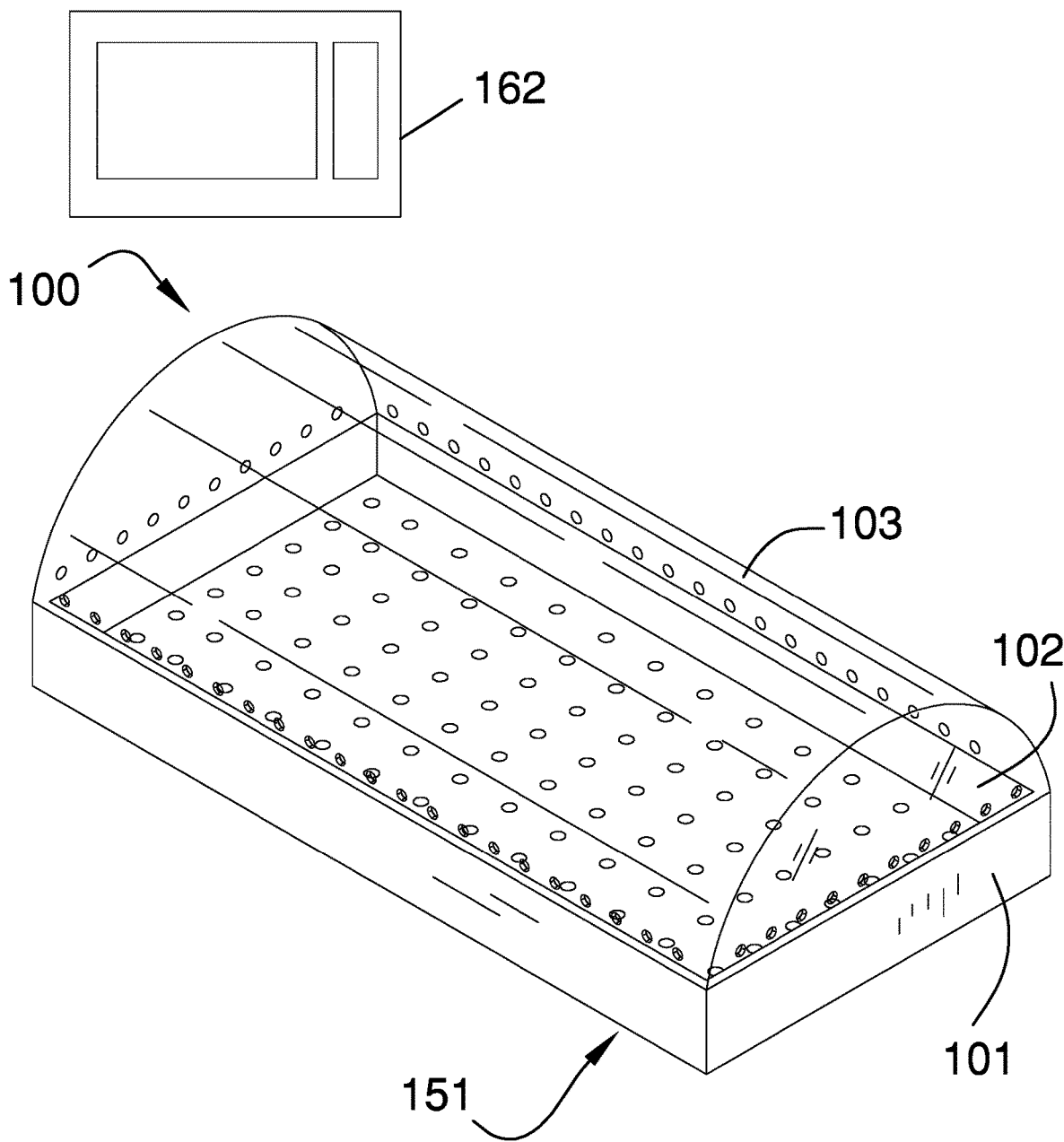
FIG. 4 is a reverse perspective view of an embodiment of the disclosure.

Detailed reference will now be made to one or more potential embodiments of the disclosure, which are illustrated in FIGS. 1 through 4.

The microwave bacon cooker 100 (hereinafter invention) is a cooking vessel. The invention 100 is configured for use with a microwave oven 162. The invention 100 is configured for use with bacon 161. The invention 100 contains the bacon 161 while the bacon 161 cooks in the microwave oven 162. The invention 100 comprises a tray 101, a foraminous cooking surface 102, and a lid 103. The lid 103 attaches to the tray 101. The foraminous cooking surface 102 is contained within the structure formed by the lid 103 and the tray 101.

The tray 101 is a hollow rectilinear block. The tray 101 contains both the bacon 161 and any lipids 163 rendered from the bacon 161 during the cooking process. The tray 101 is a molded product made from a non-conducting material with a non-polar molecular structure. The tray 101 is formed with an open face that provides access to the interior space of the tray 101. The tray 101 comprises a rectangular container 111 and a plurality of support pegs 112. The rectangular container 111 is further defined with a first face 141, a second face 142, a third face 143, a fourth face 144, an inferior face 145, and a superior face 146. The inferior face 145 is further defined with an inferior surface 151 and a superior surface 152. In the first potential embodiment of the disclosure, the superior face 146 of the tray 101 is the open face.

The rectangular container 111 forms the containment space of the tray 101. The superior face 146 of the rectangular container 111 is the open face of the rectangular container 111.

Each of the plurality of support pegs 112 is a prism-shaped post formed in the rectangular container 111. Each of the plurality of support pegs 112 is identical. Each of the plurality of support pegs 112 is formed on the superior surface of the inferior face 145 of the rectangular container 111. Each of the plurality of support pegs 112 projects perpendicularly away from the superior surface 152 of the inferior face 145 of the rectangular container 111 in the manner of a cantilever. The free end of each of the plurality of support pegs 112 forms a horizontal structure that supports the foraminous cooking surface 102 above the inferior face 145 of the rectangular container 111.

The first face 141 is a vertical surface that projects perpendicularly away from the inferior face 145. The first face 141 forms a portion of the containment space of the rectangular container 111. The second face 142 is a vertical surface that projects perpendicularly away from the inferior face 145. The second face 142 forms a portion of the containment space of the rectangular container 111.

The third face 143 is a vertical surface that projects perpendicularly away from the inferior face 145. The third face 143 forms a portion of the containment space of the rectangular container 111. The third face 143 is the face of the rectangular container 111 that is distal from the first face 141. The fourth face 144 is a vertical surface that projects perpendicularly away from the inferior face 145. The fourth face 144 forms a portion of the containment space of the rectangular container 111. The fourth face 144 is the face of the rectangular container 111 that is distal from the second face 142.

The superior face 146 is an open face that forms the top of the rectangular container 111. The inferior face 145 is a solid surface that forms the bottom of the rectangular container 111.

The inferior surface 151 is the surface of the inferior face 145 that is distal from the superior surface 152. The superior surface 152 is the surface of the inferior face 145 that forms an interior wall of the rectangular container 111.

The foraminous cooking surface 102 is a plate structure. The foraminous cooking surface 102 is a molded product made from a non-conducting material with a non-polar molecular structure. The outer dimension of the foraminous cooking surface 102 is lesser than the inner dimension of tray 101 such that the foraminous cooking surface 102 can be inserted into the hollow interior of the tray 101. The foraminous cooking surface 102 forms a supporting surface upon which the bacon 161 rests during the cooking process. The construction of the foraminous cooking surface 102 is such that the foraminous cooking surface 102 drains rendered lipids 163 away from the bacon 161 during the cooking process. The foraminous cooking surface 102 comprises a cooking plate 121 and a plurality of drains 122.

The cooking plate 121 is a rectangular plate structure that rests on the plurality of support pegs 112 to form a horizontal surface within the rectangular container 111 that is raised above the inferior face 145. The cooking plate 121 forms the physical surface upon which the bacon 161 rests.

Each of the plurality of drains 122 is an aperture formed through the cooking plate 121 such that each of the plurality of drains 122 is vertically oriented when the foraminous cooking surface 102 is placed in the tray 101. Each of the plurality of drains 122 provides a channel that allows gravity to drain any lipids 163 rendered from bacon 161 away from the bacon 161 to the inferior face 145 of the rectangular container 111.

The lid 103 is a barrier placed over the superior face 146 of the tray 101. The lid 103: 1) encloses the hollow interior of the tray 101; and, 2) allows for an exchange of gases that prevents a pressure differential from forming between the interior of the invention 100 and the atmosphere. The lid 103 is a molded product made from a non-conducting material with a non-polar molecular structure. The lid 103 comprises a quasi-cylindrical structure 130 and a plurality of vents 135. The quasi-cylindrical structure 130 is further defined with a first end 131, a second end 132, a lateral face 133, and an open plane 134.

The quasi-cylindrical structure 130 is a hollow structure formed in the shape of a horizontal segment. The quasi-cylindrical structure 130 encloses the superior face 146 of the rectangular container 111. The inner dimension of the open plane 134 of the quasi-cylindrical structure 130 is greater than the outer dimension of the superior face 146 of the rectangular container 111 such that the quasi-cylindrical structure 130 can be placed around the outer perimeter of the superior face 146 of the rectangular container 111. The superior face 146 of the rectangular container 111 inserts into the quasi-cylindrical structure 130 of the open plane 134.

The first end 131 is formed from one of the bases of the cylinder that formed the quasi-cylindrical structure 130. The second end 132 is formed from the base of the cylinder that formed the quasi-cylindrical structure 130 that is distal from the first end 131. The lateral face 133 is the surface of the quasi-cylindrical structure 130 that attaches the first end 131 to the second end 132. The open plane 134 is an opening that provides access to the interior of the quasi-cylindrical structure 130. The open plane 134 is formed at the plane that bifurcates the cylinder that forms the quasi-cylindrical structure 130.

Each of the plurality of vents 135 is an aperture formed through the lateral face 133 of the quasi-cylindrical structure 130. The plurality of vents 135 allows for the flow of gas through the lateral face 133 such that a pressure differential does not form between the interior of the invention 100 and the atmosphere.

The following definitions were used in this disclosure:

Appliance: As used in this disclosure, an appliance is a device or instrument intended to perform a single task.

Bacon: As used in this disclosure, bacon is well-known and documented foodstuff derived from a pig. Bacon is known for rendering a significant amount of liquid, primarily in the form of lipids, during the cooking process.

Bifurcate: As used in this disclosure, to bifurcate means to divide an object or space into two pieces or segments.

Cantilever: As used in this disclosure, a cantilever is a beam or other structure that projects away from an object and is supported on only one end. A cantilever is further defined with a fixed end and a free end. The fixed end is the end of the cantilever that is attached to the object. The free end is the end of the cantilever that is distal from the fixed end.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid.

When the center axes of two cylinder, prism or pyramidal structures share the same line they are said to be aligned. When the center axes of two cylinder, prism or pyramidal structures do not share the same line they are said to be offset.

Cylinder: As used in this disclosure, a cylinder is a geometric structure defined by two identical flat and parallel ends, also commonly referred to as bases, which are circular in shape and connected with a single curved surface, referred to in this disclosure as the lateral face. The cross-section of the cylinder remains the same from one end to another. The axis of the cylinder is formed by the straight line that connects the center of each of the two identical flat and parallel ends of the cylinder. Unless otherwise stated within this disclosure, the term cylinder specifically means a right cylinder which is defined as a cylinder wherein the curved surface perpendicularly intersects with the two identical flat and parallel ends.

Disk: As used in this disclosure, a disk is a cylindrically shaped object that is flat in appearance.

Exterior: As used in this disclosure, the exterior is used as a relational term that implies that an object is not contained within the boundary of a structure or a space.

Foodstuff: As used in this disclosure, a foodstuff refers to an edible material used as food.

Foraminous: As used in this disclosure, foraminous is an adjective that describes a surface, plate, or platform that is perforated with a plurality of holes.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Horizontal Segment: As used in this disclosure, a horizontal segment refers to a prism or cylinder that is bifurcated by a single plane that is parallel to or contains the center axis of the prism or cylinder.

Inner Dimension: As used in this disclosure, the term inner dimension describes the span from a first inside or interior surface of a container to a second inside or interior surface of a container. The term is used in much the same way that a plumber would refer to the inner diameter of a pipe.

Interior: As used in this disclosure, the interior is used as a relational term that implies that an object is contained within the boundary of a structure or a space.

Lid: As used in this disclosure, a lid is a removable cover that is placed over an opening of a hollow structure to enclose the hollow structure.

Lipid: As used in this disclosure, a lipid is an organic molecule that is soluble in nonpolar solvents.

Microwave Oven: As used in this disclosure, a microwave oven is an appliance that uses electromagnetic radiation to heat a foodstuff. The electromagnetic radiation most commonly used in a microwave oven is 2.45 GHz (approximately 12 cm wavelength).

Outer Dimension: As used in this disclosure, the term outer dimension describes the span from a first exterior or outer surface of a tube or container to a second exterior or outer surface of a tube or container. The term is used in much the same way that a plumber would refer to the outer diameter of a pipe.

Plate: As used in this disclosure, a plate is a smooth, flat and rigid object that has at least one dimension that: 1) is of uniform thickness; and 2) that appears thin relative to the other dimensions of the object. Plates often have a rectangular or disk-like appearance.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Rectangular Block: As used in this disclosure, a rectangular block refers to a three-dimensional structure comprising six rectangular surfaces formed at right angles. Within this disclosure, a rectangular block may further comprise rounded edges and corners.

Rounded: A used in this disclosure, the term rounded refers to the replacement of an apex, vertex, or edge or brink of a structure with a (generally smooth) curvature wherein the concave portion of the curvature faces the interior or center of the structure.

Rounded Rectangle: A used in this disclosure, a rounded rectangle is a rectangle wherein one or more of the corner structures of the rectangle are replaced with a curvature wherein the concave portion of the curvature faces the center of the rounded rectangle.

Shaft: As used in this disclosure, a shaft is a long, narrow and rigid prism structure that is used as: 1) a structural element of a larger object; or 2) as a grip or lever for a handle. Shafts are often cylindrical in shape.

Supporting Surface: As used in this disclosure, a supporting surface is a horizontal surface upon which an object is placed. This disclosure assumes that an object resting on a supporting surface is in an orientation that is appropriate for the normal or anticipated use of the object.

Tray: As used in this disclosure, a tray is a flat plate-like structure that has a raised rim formed around the perimeter to contain fluids within the structure of the tray. Trays will generally give an impression of being a shallow containment device. Trays are often used for carrying food and drink or for holding small items.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

With respect to the above description, it is to be realized that the optimum dimensional relationship for the various components of the invention described above and in FIGS. 1 through 4 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A cooking vessel comprising:
   wherein the cooking vessel comprises a tray, a foraminous cooking surface, and a lid;
   wherein the lid attaches to the tray;
   wherein the foraminous cooking surface is contained within the structure formed by the lid and the tray;
   wherein the cooking vessel is configured for use with a microwave oven;
   wherein the cooking vessel is configured for use with bacon;
   wherein the bacon renders lipids during cooking;
   wherein the cooking vessel contains the bacon while the bacon cooks in the microwave oven;
   wherein the tray is a hollow rectilinear block;
   wherein the tray contains both the bacon and any lipids rendered from the bacon during the cooking process;
   wherein the tray is formed with an open face;
   wherein the open face provides access to the interior space of the tray;
   wherein the foraminous cooking surface is a plate structure;
   wherein the foraminous cooking surface forms a supporting surface upon which the bacon rests during the cooking process;
   wherein the construction of the foraminous cooking surface is such that the foraminous cooking surface drains rendered lipids away from the bacon during the cooking process;
   wherein the lid is a barrier placed over the superior face of the tray;
   wherein the lid encloses the hollow interior of the tray;
   wherein the lid allows for an exchange of gases that prevents a pressure differential from forming between the interior of the cooking vessel and the atmosphere;
   wherein the tray comprises a rectangular container and a plurality of support pegs;
   wherein the plurality of support pegs are formed in the rectangular container;
   wherein the rectangular container is further defined with a first face, a second face, a third face, a fourth face, an inferior face, and a superior face;
   wherein the inferior face is further defined with an inferior surface and a superior surface;
   wherein the superior face of the tray is the open face.

2. The cooking vessel according to claim 1 wherein the rectangular container forms the containment space of the tray.

3. The cooking vessel according to claim 2
   wherein each of the plurality of support pegs is a prism-shaped post;
   wherein each of the plurality of support pegs is formed on the superior surface of the inferior face of the rectangular container.

4. The cooking vessel according to claim 3 wherein each of the plurality of support pegs is identical.

5. The cooking vessel according to claim 4
   wherein each of the plurality of support pegs projects perpendicularly away from the superior surface of the inferior face of the rectangular container;
   wherein each of the plurality of support pegs projects away from the inferior face in the manner of a cantilever.

6. The cooking vessel according to claim 5
   wherein the free end of each of the plurality of support pegs forms a horizontal structure;
   wherein the free end of each of the plurality of support pegs raises the foraminous cooking surface above the inferior face of the rectangular container.

7. The cooking vessel according to claim 6
   wherein the first face is a solid vertical rectangular surface that projects perpendicularly away from the inferior face and forms a portion of the containment space of the rectangular container;
   wherein the second face is a solid vertical rectangular surface that projects perpendicularly away from the inferior face and forms a portion of the containment space of the rectangular container;
   wherein the third face is a solid vertical rectangular surface that projects perpendicularly away from the inferior face and forms a portion of the containment space of the rectangular container;
   wherein the fourth face is a solid vertical rectangular surface that projects perpendicularly away from the inferior face and forms a portion of the containment space of the rectangular container;
   wherein the inferior face is a solid horizontal rectangular surface that forms the bottom of the rectangular container.

8. The cooking vessel according to claim 7 wherein the outer dimension of the foraminous cooking surface is lesser than the inner dimension of the tray such that the foraminous cooking surface inserts into the hollow interior of the tray.

9. The cooking vessel according to claim 8
   wherein the foraminous cooking surface comprises a cooking plate and a plurality of drains;
   wherein the plurality of drains are formed in the cooking plate;
   wherein the cooking plate forms the physical surface upon which the bacon rests.

10. The cooking vessel according to claim 9 wherein the cooking plate rests on the plurality of support pegs.

11. The cooking vessel according to claim 10
    wherein each of the plurality of drains is an aperture formed through the cooking plate such that each of the plurality of drains is vertically oriented when the foraminous cooking surface is placed in the tray;
    wherein each of the plurality of drains provides a channel that allows gravity to drain any lipids rendered from bacon away from the bacon to the inferior face of the rectangular container.

12. The cooking vessel according to claim 11
    wherein the lid comprises a quasi-cylindrical structure and a plurality of vents;
    wherein the quasi-cylindrical structure is further defined with a first end, a second end, a lateral face, and an open plane;
    wherein the plurality of vents are formed in the lateral face of the quasi-cylindrical structure.

13. The cooking vessel according to claim 12
wherein the quasi-cylindrical structure is a hollow structure;
wherein the quasi-cylindrical structure is in the shape of a horizontal segment;
wherein the quasi-cylindrical structure encloses the superior face of the rectangular container;
wherein the inner dimension of the open plane of the quasi-cylindrical structure is greater than the outer dimension of the superior face of the rectangular container such that the superior face of the rectangular container inserts into the quasi-cylindrical structure of the open plane.

14. The cooking vessel according to claim 13
wherein each of the plurality of vents is an aperture formed through the lateral face of the quasi-cylindrical structure;
wherein the plurality of vents allows for the flow of gas through the lateral face such that a pressure differential does not form between the interior of the cooking vessel and the atmosphere.

15. The cooking vessel according to claim 14
wherein the tray is a molded product made from a non-conducting material with a non-polar molecular structure;
wherein the foraminous cooking surface is a molded product made from a non-conducting material with a non-polar molecular structure;
wherein the lid is a molded product made from a non-conducting material with a non-polar molecular structure.

* * * * *